United States Patent
Itkonen

(10) Patent No.: US 6,690,756 B1
(45) Date of Patent: Feb. 10, 2004

(54) SYNCHRONIZATION METHOD AND RECEIVER COMPRISING MULTIPLICATION MEANS, TRANSFORM AND COMPARISON MEANS

(75) Inventor: Jarkko Itkonen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/319,349
(22) PCT Filed: Dec. 12, 1997
(86) PCT No.: PCT/FI97/00784
§ 371 (c)(1),
(2), (4) Date: Jun. 4, 1999
(87) PCT Pub. No.: WO98/26512
PCT Pub. Date: Jun. 18, 1998

(30) Foreign Application Priority Data

Dec. 12, 1996 (FI) .................................................. 964983

(51) Int. Cl.$^7$ ............................. H04L 7/00; H04B 17/00
(52) U.S. Cl. ........................ 375/368; 375/227; 375/354
(58) Field of Search ................................. 375/149, 150, 375/227, 343, 340, 354, 365, 368, 224; 455/67.1, 67.3, 226.1, 226.2, 266.3, 67.11, 67.12

(56) References Cited

U.S. PATENT DOCUMENTS

| | | | | |
|---|---|---|---|---|
| 4,020,283 A | * | 4/1977 | Epstein ........................ | 375/336 |
| 5,450,456 A | | 9/1995 | Mueller | |
| 5,500,878 A | * | 3/1996 | Iwasaki ........................ | 375/344 |
| 5,920,278 A | * | 7/1999 | Tyler et al. .................. | 375/356 |
| 6,289,064 B1 | * | 9/2001 | Hiramatsu et al. ........... | 375/368 |

FOREIGN PATENT DOCUMENTS

| | | |
|---|---|---|
| EP | 0 689 313 | 12/1995 |
| EP | 0 756 391 | 1/1997 |
| EP | 0 782 294 | 7/1997 |
| EP | 0 782 295 | 7/1997 |
| JP | 5-167558 | 7/1993 |
| JP | 7-250120 | 9/1995 |
| WO | WO 96/41458 | 12/1996 |

OTHER PUBLICATIONS

Copy of International Search Report for PCT /FI97/00784.
Carlson, A. Burce, "Communication Systems, An Introduction to Signals and Noise in Electrical Communication," Third Edition, Irwin/McGraw Hill, 1986, pp. 106–115, 617, and 630–633.
Mouly, Michel, et al, "The GSM System for Mobile Communications," Michel Mouly and Marie–Bernadette Pautet, France, 1992, pp 230–241.

* cited by examiner

Primary Examiner—Betsy L. Deppe
(74) Attorney, Agent, or Firm—Squire, Sanders & Dempsey L.L.P.

(57) ABSTRACT

A synchronization method and a receiver used in a radio system in which synchronization is made to a received signal are provided. The radio system includes at least one receiver, which receives a modulated and partly previously known signal that includes symbols. The received signal also contains a time and frequency deviation. The receiver includes a multiplier, a transformer and a comparator. The multiplier multiplies the received signal by the known part of the received signal in order to obtain a product. The transformer correlates the product in order to obtain a ratio. The comparator compares the ratio with a pre-set correlation threshold value. Based upon the comparison made by the comparator, a decision is made whether the received signal is synchronized.

12 Claims, 1 Drawing Sheet

SYNCHRONIZATION METHOD AND RECEIVER COMPRISING MULTIPLICATION MEANS, TRANSFORM AND COMPARISON MEANS

FIELD OF THE INVENTION

The invention relates to a reception method used in a radio system for synchronization to a received signal, the radio system comprising at least one receiver receiving modulated and partly previously known signal consisting of symbols and the signal,containing time and frequency deviation.

The invention further relates to a receiver used in a radio system in which synchronization is made to the received signal, the radio system comprising at least one receiver receiving modulated and partly previously known signal consisting of symbols and the signal containing time and frequency deviation.

BACKGROUND OF THE INVENTION

In radio systems a user data signal usually modulates a high frequency signal transmitted through the radio path to a receiver. The receiver can be located very far from a transmitter depending on the radio system. For example, in satellite radio systems a base station functioning as a transceiver can be located at a height of 38000 km above the equator. On the radio path between a transmitter and a receiver the signal is always subjected to interference that impair the signal properties. In satellite radio systems the base station typically moves in relation to the earth in such a way that seen from the ground the base station is stationary. The base stations can also be on relatively low orbits, the satellites then moving in relation to the earth faster than the satellites of said satellite system. The movement of satellites causes big frequency and time delay variations.

It is typical for a radio system environment that a signal travelling between a user and a base station does not travel straight but depending on the environment the signal propagates on paths of various lengths from the transmitter to the receiver. Such a multipath propagation occurs even though there is a direct line of sight between the base station and the mobile station. The multipath propagation results from the signal being reflected and scattered in the peripheral interfaces it encounters. Signals propagating on different paths have a propagation delay of a different length, the signals thus arriving at the receiver in different phases.

On the radio path various forms of interference modify the modulated signal, thus significantly complicating the separation or demodulation, of the data signal in the receiver. As the propagation time of the signal transmitted by the transmitter is limited, the signal is subjected to delay. The longer the distance between the transmitter and the receiver, the more delay is generated. Furthermore, the movement of the base station or the subscriber terminal, for example a mobile phone, produces Doppler frequencies. The Doppler frequencies change the signal frequency received by the receiver. The signal frequency change causes problems for the synchronization of the receiver to the received signal.

The above described delay and frequency problems have been avoided using various algorithm methods such as methods based on correlation. However, some restrictions have been placed on the methods based on correlation. For example, a very small frequency error of the signal received by the receiver has been allowed in order to enable synchronization by using the method. Sufficient time synchronization has not been achieved with prior art solutions.

A prior art method is based on indicating the signal burst power transmitted by the transmitter. In this method a sliding window is used for estimating signal power and noise power. Signal power is compared with noise power, and the disadvantageous signal properties can then be estimated. However, it is only possible to use the method for estimating a bursty signal. In addition, the method has not been applicable to radio systems with a small signal-to-noise ratio. Consequently prior art methods have not been well applicable to e.g. satellite radio systems.

SUMMARY OF THE INVENTION

An object of the present invention is to implement a method in which the receiver can synchronize to a signal it has received, the signal containing a substantial amount of changes caused by delay and frequency.

This is achieved with the method set forth in the preamble characterized in that the received signal is multiplied by the known part of the signal, whereby a product is obtained, the product is correlated, whereby a ratio is obtained, the ratio is then compared with a pre-set correlation threshold value on the basis of which comparison a decision is made on synchronization to the received signal.

The receiver of the invention is characterized in that the receiver comprises multiplication means for multiplying the received signal by the known part of the received signal in order to obtain the product, transform means for correlating the product, whereby a ratio is obtained, and comparison means for comparing the ratio with a pre-set correlation threshold value on the basis of which comparison a decision is made on synchronization to the received signal.

Great advantages are achieved with the method of the invention. In this method a part of the received signal is known. The received signal is multiplied by the known part of the received signal such as training sequences. Signal multiplication removes signal modulation when the received signal corresponds with the known part. The modulation is removed with an accuracy of one symbol. A product preferably correlated using FFT-transform is obtained by multiplying the signal. The correlation is performed substantially simultaneously at time and frequency level. Correlation allows to decide on synchronization to the received signal and to calculate even a big frequency deviation in the received signal. In this method synchronization is made to the signal if the ratio obtained on the basis of the correlation exceeds the pre-set correlation threshold value. The method is further applicable to signals with a small signal-to-noise ratio.

BRIEF DESCRIPTION OF THE DRAWINGS

In the following, the invention will be described in greater detail with reference to examples in the accompanying drawings, in which.

DETAILED DESCRIPTION OF THE PREFERRED EMBODIMENTS

Figure 1:
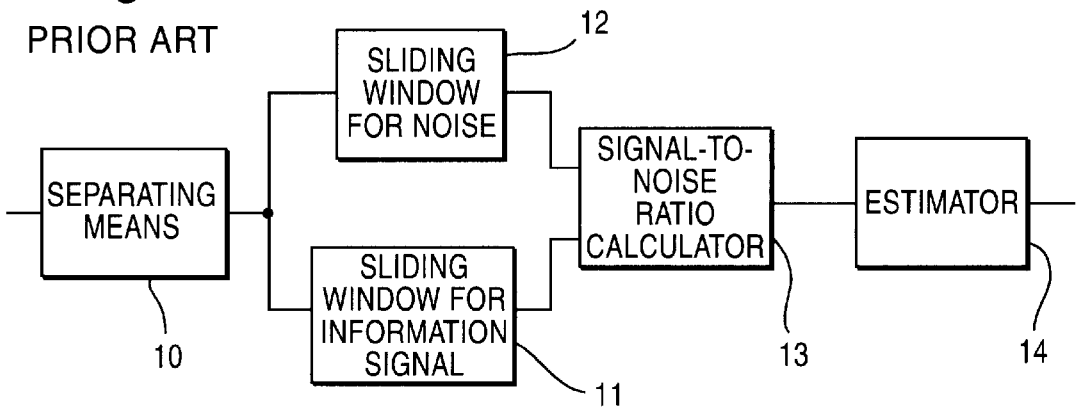
FIG. 1 shows a prior art solution.

FIG. 1 shows a prior art solution used for synchronization to a digital signal. The solution alleviates the problems of the signal caused by delay and frequency changes in signal reception. The solution comprises means that separate noise from the signal containing information. The solution further comprises means 11 and 12 communicating with means 10. Means 11 generate a sliding window for the signal containing information. Means 12 generate a sliding window for noise. In addition, the solution comprises means 13 and 14 that are connected to each other.

The signal is conveyed from means 11 and 12 to means 13 which calculate an estimate of the signal's signal-to-noise ratio. Means 14 make a decision on the existence of the synchronization of said signal on the basis of the signal-to-noise ratio. Furthermore, means 14 generate an estimate of the frequency error of the signal. The solution is substantially advantageous, when the received signal is bursty and the signal's signal-to-noise ratio is big. Owing to what has been mentioned above the solution is not well applicable to implemented radio systems in which the signal-to-noise ratio is small and the frequency and time deviations of the signal are big.

Figure 2:
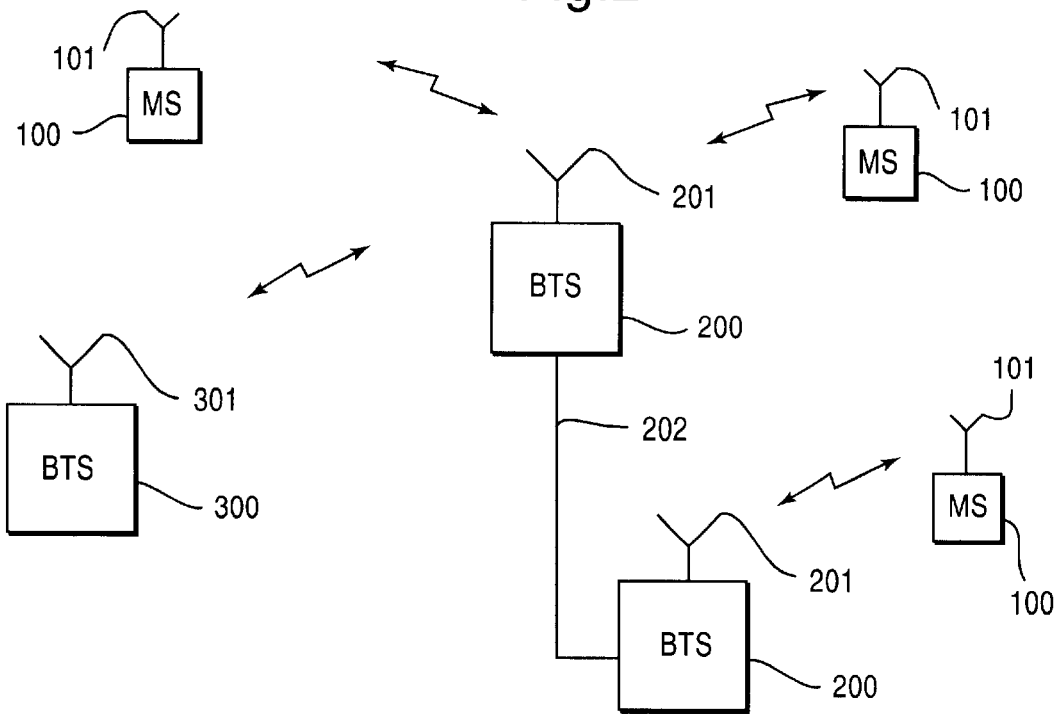
FIG. 2 shows a radio system using the method of the invention.

FIG. 2 shows a radio system using the method of the invention. The radio system comprises subscriber terminals 100 and base stations 200 and 300. Subscriber terminals 100 establish connections to other subscriber terminals 100 through base stations 200, 300. In the solution of FIG. 2 base station 200 functions as an earth station and base station 300 functions as a satellite station. In the radio system of FIG. 2 base stations 200 are combined e.g. on transmission line 202 using PCM technique. Subscriber terminal 100 comprises antenna 101, base station 200 comprises antenna 201 and base station 300 comprises antenna 301. Said antennas function as transmission and receiving antennas. In satellite radio systems the transmission power of subscriber terminal 100 is generally sufficient for establishing a connection to satellite station 300.

The distance between earth station 200 and satellite station 300 is long compared with the distance of terrestrial radio system base stations 200. The long distance causes much signal attenuation and a considerable amount of delay in the signal. In addition, stations 300 move in the satellite systems, the movement causing Doppler frequencies to the signal. The Doppler frequencies further complicating the signal reception at the earth station and the satellite station. Subscriber terminals 100 also cause Doppler frequencies when they move.

Figure 3:
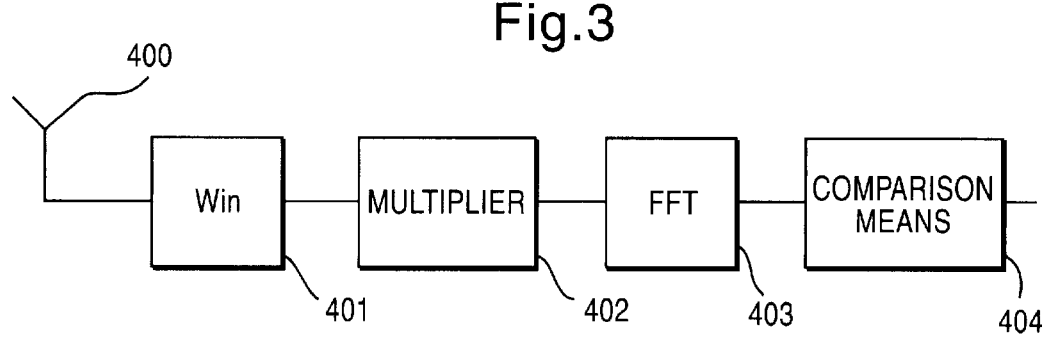
FIG. 3 shows the structure of the receiver of the invention as a block diagram.

FIG. 3 shows the structure of the receiver of the invention as a block diagram. It is possible to use the receiver of the invention e.g. in subscriber terminal 100 and in base station 200 and 300. The receiver comprises antenna 400 using which the signal transmitted by base station 200 is received. In practice reception antenna 400 is also used for transmitting signal. The signal received by the receiver consists of bits that form symbols. The received signal can be formed of complex parts. Typically one or two bits form a symbol. The receiver also comprises means 401 which form a sliding window for the received signal. Furthermore, the receiver comprises multiplication means 402, transform means 403 and comparison means 404.

The receiver receives a modulated signal into which time instability and frequency changes have been formed during transfer. After reception the signal is conveyed to means 401 that form a sliding window for the signal. The sliding window width formed by means 401 can be for example 96 bits. From means 401 the signal is conveyed to multiplication means 402. The sliding window width determines the number of bits arriving at a time to multiplication means 402. The receiver of the invention can be located e.g. in subscriber terminal 100 or at the base station 200, 300.

The receiver previously knows the received signal for some parts. Multiplication means 402 multiply the signal arriving from means 401 by the previously known comparison sequence of the signal, for example the synchronization part of the signal, whereby the product is obtained. Furthermore, multiplication means 402 add fill bits, zero bits in this case, to the signal. Multiplication means 402 can produce the product also by using another way corresponding to multiplication as addition. Multiplication by the known comparison sequence such as a training sequence removes the signal modulation when the sliding window is in the received signal at said sequence. There is a peak in the correlation formed by means 403 in said situation. Information about the sliding window location at said moment enable the removal of the time instability.

Transform means 403 form a correlation for the signal arriving from multiplication means 402. Transform means 403 also form an estimate from the frequency error of said signal. Transform means 403 further estimate the noise power size of the received signal. Transform means 403 preferably perform FFT transform (Fast Fourier Transform). In its general mode, the Fourier transform is calculated as an integral in the following way:

$$\mathcal{F}\{f(t)\} = F(\omega) = \frac{1}{\sqrt{2\Pi}} \int_{-\infty}^{\infty} f(t)e^{-i\omega t}dt,$$

where $\mathcal{F}$ represents Fourier transform, f(t) is a function of time t, F(ω) is a Fourier transformed function, ω is a frequency variable, i is an imaginary unit and Π represents number pi. The Fourier transform integral is calculated in the digital system using summation where N terms to be summed are included. However, the number of operations in FFT transform has been considerably reduced. The Fourier transform usually requires $N^2$ operations but FFT transform can preferably be performed with $N*\log_2(N)$ operations (Danielson-Lanczos theorem).

It is possible to use e.g. Laplace transform instead of FFT transform. However, FFT transform is an efficient method when frequency is estimated at a long frequency interval. Transform means 403 search substantially for a peak value from the FFT transformed signal and calculate the mean of the signal. Then, transform means 403 compare the peak value with the mean of said signal in order to obtain the ratio. The ratio can be based on e.g. division. Correlation enables the decision on the existence of the synchronization from the received signal. Multiplication and correlation of the signal implements the following equation (1).

$$|\mu(t_s, f_e)| = \left| \sum_{n=0}^{N-1} e^{-j2\Pi f_e n T_s} a_n^* z_{t-n} \right| \tag{1}$$

The complex conjugation symbols of the known comparison sequence are denoted by $a_n*$ and the sequence length of the comparison sequence is denoted by N in the equation. The complex signal received by the receiver is denoted by z and the frequency estimate of the received signal is denoted by $f_e$. Time is denoted by t and symbol time is denoted by $T_s$. In the solution of the invention the signal is simultaneously correlated at time and frequency level. The ratio of the peak value and the mean formed in transform means 403 is compared with a pre-set threshold value. In the solution of the invention the decision on the synchronization to the signal received by the receiver is made if the ratio exceeds the threshold value set.

The sliding window formed in means, 401 slides one symbol at a time. The symbols are conveyed from means 401 to multiplication means 402 where the symbols are multiplied by the known sequence. The modulation in the signal is removed upon multiplication. Then, zeros are added to the signal. By adding zeros the signal's sequence length is adapted to match transform means 403. Addition of zeros also increases the frequency resolution of the signal. Transform means 403 search for correlating frequencies from the presumed frequency area $f_e$, and then said signals are compared.

Another alternative for making said decision is to utilize the signal noise power estimated by transform means 403. In this method the noise power is compared with the signal peak value obtained from the FFT transform. In this embodiment, the decision to synchronize the signal is also made if the ratio of the signals exceeds the pre-set threshold value. Sequences of previously known lengths are processed sequentially in transform means 403, which sequences are further transmitted to comparison means 404.

More over, the method enables substantially the signal noise power peak value and the noise power mean to be calculated, the calculated values being compared. The signal based on the mean result is delayed before the creation of the noise power peak value and the mean ratio. The use of the method based on; noise power estimation is possible also with a poor signal-to-noise ratio of the signal. The method is further applicable to bursty signals. Both methods enable simultaneous time and frequency synchronization.

Even though the invention has been described with reference to the example of the accompanying drawings, it is obvious that the invention is not restricted to it but can be modified in various ways within the scope of the inventive idea disclosed in the attached claims.

What is claimed is:

1. A reception method used in a radio system for synchronization to a received signal, the radio system comprising at least one receiver receiving the received signal comprising a modulated and partly previously known signal consisting of symbols and the received signal containing time and frequency deviation, the method comprising:

multiplying the received signal by a known part of a received signal to obtain a product;

correlating the product using a transform means to obtain a ratio; and performing a comparison by comparing the ratio with a pre-set correlation threshold value, wherein a decision is made whether the received signal is synchronized based upon the comparison, further comprising correlating the received signal simultaneously at a time and frequency level.

2. A method as claimed in claim 1, further comprising:

calculating a correlation maximum value and a mean; and comparing the correlation maximum value and the mean to obtain a ratio.

3. A method as claimed in claim 1, further comprising calculating a mean signal noise power and the ratio from a relationship between a signal maximum value and the mean signal noise power.

4. A method as claimed in claim 1, further comprising calculating a mean signal noise power and the ratio from a relationship between a signal noise power maximum value and the mean signal noise power.

5. A method as claimed in claim 1, further comprising using the signal multiplication to remove the signal modulation.

6. A reception method used in a radio system for synchronization to a received signal, the radio system comprising at least one receiver receiving the received signal comprising a modulated and partly previously known signal consisting of symbols and the received signal containing time and frequency deviation, the method comprising:

multiplying a received signal by a known part of a received signal to obtain a product;

correlating the product using a transform means to obtain a ratio; and performing a comparison by comparing the ratio with a pre-set correlation threshold value, wherein a decision is made whether the received signal is synchronized based upon the comparison, further comprising calculating the frequency deviation of the received signal using a Fast Fourier transform.

7. A receiver used in a radio system in which synchronization is made to a received signal, the radio system comprising at least one receiver receiving the received signal comprising a modulated and partly previously known signal consisting of symbols and the received signal containing time and frequency deviation, the receiver comprises:

multiplication means for multiplying the received signal by a known part of the received signal in order to obtain the product;

transform means for correlating the product to obtain a ratio; and comparison means for performing a comparison by comparing the ratio with a pre-set correlation threshold value, wherein a decision is made, based upon said comparison, to synchronize the received signal, wherein the transform means correlates the received signal simultaneously at time and frequency level.

8. A receiver as claimed in claim 7, wherein the transform means calculate a correlation maximum value and a mean which are compared with each other for obtaining the ratio.

9. A receiver as claimed in claim 7, wherein the transform means calculate signal noise power and the transform means calculate the ratio from a relationship between signal maximum value and the mean signal noise power.

10. A receiver as claimed in claim 7, wherein the transform means calculate signal noise power and the transform means calculate the ratio from a relationship between a signal noise power maximum value and mean signal noise power.

11. A receiver as claimed in claim 7, wherein the multiplication means remove the signal modulation using signal multiplication.

12. A receiver used in a radio system in which synchronization is made to a received signal, the radio system comprising at least one receiver receiving the received signal comprising a modulated and partly previously known signal consisting of symbols and the received signal containing time and frequency deviation, the receiver comprises:

multiplication means for multiplying the received signal by a known part of the received signal in order to obtain the product;

transform means for correlating the product to obtain a ratio; and comparison means for performing a comparison by comparing the ratio with a pre-set correlation threshold value, wherein a decision is made, based upon said comparison, to synchronize the received signal, wherein the transform means calculate a frequency deviation of the received signal using a fast Fourier transform.

* * * * *